UNITED STATES PATENT OFFICE.

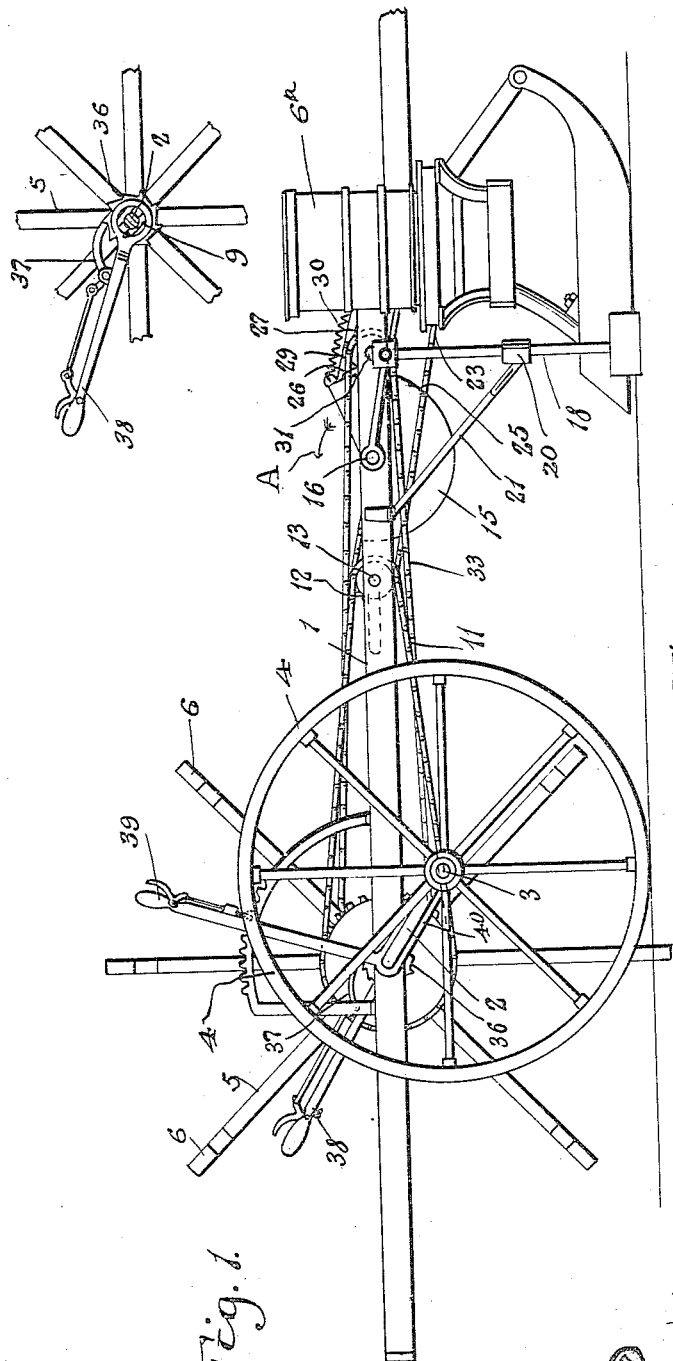

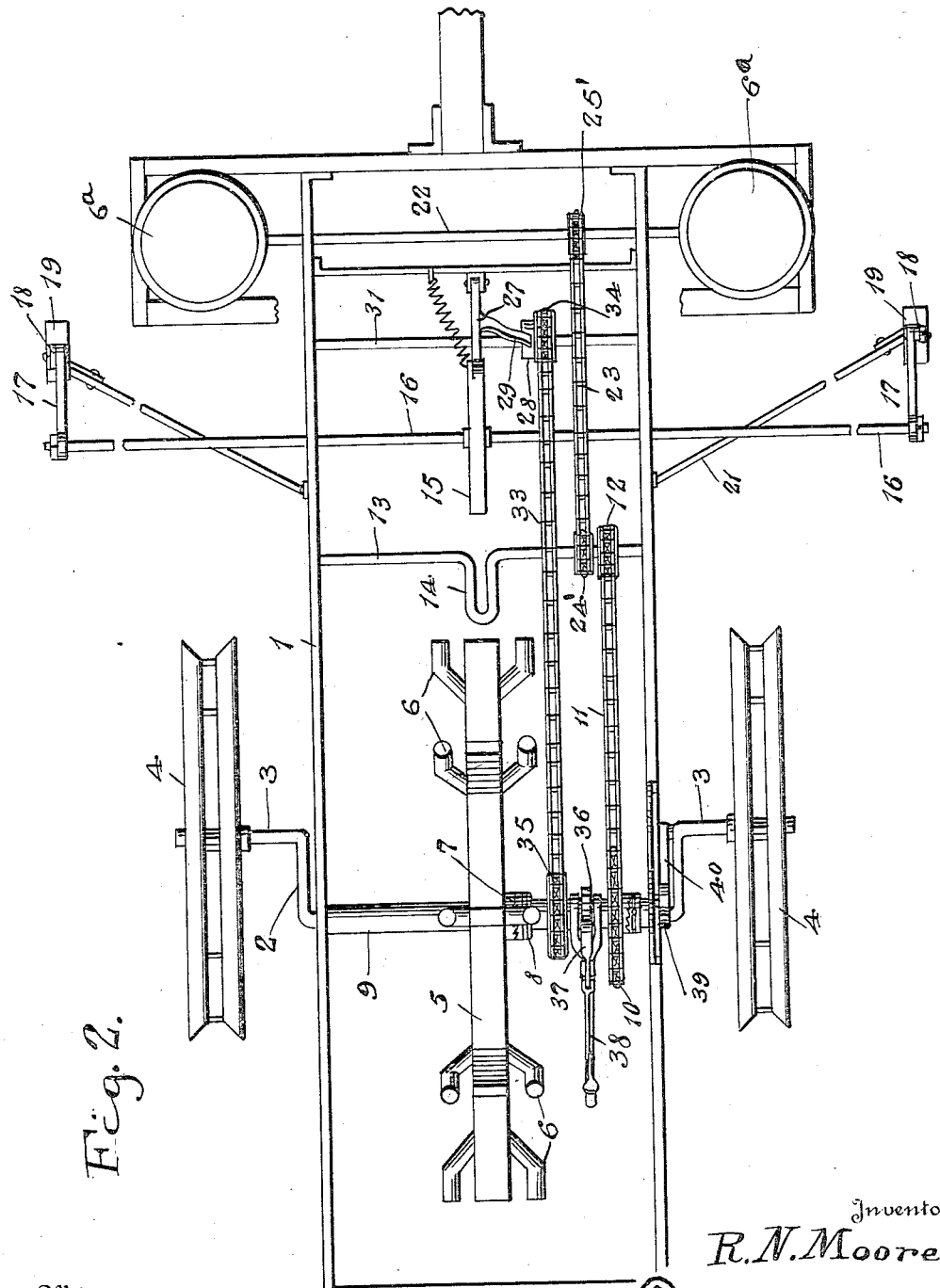

RAY N. MOORE, OF AMES, IOWA.

CORN-PLANTER.

1,243,541. Specification of Letters Patent. Patented Oct. 16, 1917.

Application filed November 11, 1916. Serial No. 130,830.

*To all whom it may concern:*

Be it known that I, RAY N. MOORE, a citizen of the United States, residing at Ames, in the county of Story and State of Iowa, have invented certain new and useful Improvements in Corn-Planters; and I do hereby declare the following to be a full, clear, and exact description of the invention, such as will enable others skilled in the art to which it appertains to make and use the same.

This invention relates to corn planters, and the primary object of the invention is to provide an attachment for corn planters, whereby the corn may be planted in checked rows, without the use of the usual knotted wire employed for this purpose and further to provide means whereby the distance between the hills of corn planted may be varied at the will of the operator.

A still further object of this invention is to provide a marker structure, for use in combination with the check row corn planting structure which will make a mark along side of the row of planted grain, each time a hill of corn is planted.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved corn planter.

Fig. 2 is a top plan view of the planter.

Fig. 3 is a fragmentary longitudinal section through the planter.

Fig. 4 is a fragmentary sectional view of the construction employed for manually rotating the dropping mechanism operating wheel.

Referring more particularly to the drawings, 1 designates the supporting frame of the corn planter as an entirety, which has an arch axle 2 rockably carried thereby, upon the outer lower spindle ends 3 of which are mounted the usual type of supporting wheels 4, which support the corn planter.

Mounted upon the crank or arch portion of the arch axle 2 is the operating wheel 5, which controls the operation of the seed dispensing mechanism generically indicated by the numeral 6ª, which mechanisms may be of any ordinary construction now employed in check row corn planters. The wheel 5 has a plurality of fingers 6 formed upon the spokes of the same, which are adapted for gripping the ground, for rotating the wheel by the travel of the corn planter. The hub of the wheel has a clutch section 7 mounted thereon which is adapted for engagement with a clutch section 8 mounted upon a sleeve 9, which sleeve is rotatably mounted upon the arch of the axle 2 so that when the clutch sections 7 and 8 are in engagement with each other, the sleeve 9 will be rotated by the rotation of the drive wheel 5.

A sprocket 10 is mounted upon the sleeve 9, and a sprocket chain 11 passes about this sprocket and about a sprocket 12 which is mounted upon a shaft 13. The shaft 13 is rotatably supported by the frame 1 and it has a crank portion 14 formed thereon intermediate of its ends, which crank portion is adapted for striking a substantially semi-circular cam 15. The cam 15 is keyed upon a shaft 16 which extends transversely of the planter frame and projects upon each side of the planter frame substantially one-half of the width of the frame, as clearly shown in Fig. 2 of the drawings. The shaft 16 has arms 17 formed upon its outer ends, and extending therefrom at angles, which arms have the vertically movable marker carrying rods 18 connected thereto. Markers 19 are attached to the lower ends of the rods 18. The rods 18 extend slidably through suitable bearings 20, which are connected to the outer ends of braces 21, by a slot and pin connection. The shaft 13 has operative connection with the seed dispensing mechanism operating shaft 22 by a sprocket chain 23 which travels about sprockets 24' and 25' carried by the shafts 13 and 22 respectively so that the seed dispensing mechanisms will be operated in unison with the rotation of the shaft 13.

During the rotation of the shaft 13, the crank portion 14 will strike the substantially semi-circular shaped cam 15, at the point 24, and rock the same in the direction indicated by the arrow A in Fig. 1 of the drawings. The rocking of the cam 15 will rock the shaft 16 and raise the arms 17 and the marker carrying rods 18, moving the markers 19 out of engagement with the ground. The cam 15 is provided with a notch 25 formed in its periphery, in which the end 26 of a pawl 27 moves, when the cam 15 is moved upwardly by the crank portion 14. The end 26 of the pawl 27, will be held in the notch 25 until the large portion of the cam 28 moves into engagement with the arm 29 of the pawl, which will move the pawl upwardly out of the notch 25, at which time the spring 30 will automatically return the cam 15 to its normal position, rock the shaft 16 and force the marker arms 18 and the markers 19 carried thereby, downwardly making a mark upon the ground. The cam 28 is timed so that it will release the pawl at the same time that the seed dispensing mechanism is operated, thereby making a mark on the ground at the same time as the planting of the hill of corn. The cam 28 is mounted upon a shaft 31, which shaft is rotated, by the sleeve 9 through the medium of a sprocket chain 33 and sprockets 34 and 35 which are carried by the shaft 31 and the sleeve 9 respectively.

The sleeve 9 has a ratchet wheel 36 mounted thereon with which the pawl 37, which is carried by a hand lever 38 coacts, so that when the hand lever 38 is oscillated, the sleeve 9 may be rotated manually for rotating the shafts 13 and 31.

When it is desired to change the distance between the hills of corn planted, the hand lever 39 is rocked. The hand lever 39 is pivotally connected to the supporting frame 1 and it has a downwardly extending arm 40 which is connected to one of the spindles 3 of the axle 2 so that when the hand lever 39 is rocked, the spindles will be raised or lowered, for raising or lowering the rear end of the frame 1 with respect to the ground, as desired, thereby either decreasing or increasing the speed of rotation of the wheel 5, and consequently of the seed dispensing shaft 22 and the marker operating shaft 13.

From the foregoing description taken in connection with the accompanying drawings, the advantages of construction and of the method of operation of the improved corn planter will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a corn planter structure, the combination, of a supporting frame, a seed dispensing mechanism carried by said supporting frame, an arch axle, supporting wheels mounted upon the spindle ends of said arch axle, a drive wheel rotatably mounted upon the arch of said axle, and means operated by the rotation of said drive wheel for operating said seed dispensing mechanism.

2. In a corn planter structure, the combination, of a supporting frame, a seed dispensing mechanism carried by said supporting frame, an arch axle, supporting wheels mounted upon the spindle ends of said arch axle, a drive wheel rotatably mounted upon the arch of said axle, means operative by the rotation of said drive wheel for operating said seed dispensing mechanism, and means for manually rotating said drive wheel and operating said seed dispensing mechanism independent of forward movement of the supporting frame.

3. In a corn planter structure, the combination, of a supporting frame, a seed dispensing mechanism carried by said supporting frame, an arch axle, supporting wheels mounted upon the spindle ends of said arch axle, a sleeve rotatably mounted upon the arch of said axle, a drive wheel rotatably mounted upon said sleeve, clutch means for controlling the rotation of said sleeve by the rotation of said drive wheel, and means operated by the rotation of said sleeve for operating said seed dispensing mechanism.

4. In a corn planter structure, the combination, of a supporting frame, a seed dispensing mechanism carried by said supporting frame, an arch axle rotatably carried by said supporting frame, supporting wheels mounted upon the spindle ends of said arch axle, a drive wheel rotatably mounted upon the arch of said axle, means operatively connecting said drive wheel and said seed dispensing mechanism for operating the seed dispensing mechanism by the rotation of the drive wheel, a lever carried by said supporting structure and connected to the arch axle, whereby the arch axle may be rocked to raise or lower the rear end of the supporting frame.

5. In a corn planter structure, the combination, of a supporting frame, a seed dispensing mechanism carried by said supporting frame, an arch axle rotatably carried by said supporting frame, supporting wheels mounted upon the spindle ends of said arch axle, a drive wheel rotatably mounted upon the arch of said axle, means operatively connecting said drive wheel and said seed dispensing mechanism for operating the seed dispensing mechanism by the rotation of the drive wheel, a lever pivotally carried by said supporting structure and connected to said arch axle for rocking the arch axle for raising or lowering the rear end of the supporting frame with respect to the ground, and means for manually rotating said drive wheel and operating said seed dispensing mechanism independent of forward movement of the supporting frame.

6. In a corn planter structure, the combination of a supporting frame, an arch axle carried by said supporting structure, a drive wheel carried by the arch of said axle, a shaft rotatably carried by said supporting frame, means operatively connecting said shaft to said drive wheel for rotating the shaft by the rotation of the drive wheel, a second shaft rotatably carried by said supporting frame and having transversely disposed arms formed upon its outer ends, marker structures carried by said arms, a segmental cam carried by said second mentioned shaft, an arm formed upon said first named shaft for striking said segmental cam for rocking said second named shaft for moving said markers upwardly out of a marking position, a seed dispensing mechanism, means for operating said seed dispensing mechanism by the rotation of said drive wheel, and means operable by the rotation of said drive wheel for releasing said second named shaft for permitting said markers to fall synchronously with the dispensing of seeds by said dispensing mechanism.

7. In a corn planter structure, the combination, of a supporting frame, an arch axle carried by said supporting frame, a drive wheel carried by the arch of said axle, a shaft rotatably carried by said supporting frame, means operatively connecting said shaft to said drive wheel for rotating the shaft by the rotation of the drive wheel, a second shaft rotatably carried by said supporting frame, transversely disposed arms formed upon the outer ends of said second named shaft, marker structures carried by said arms, a segmental cam carried by said second named shaft, an arm formed upon said first named shaft for striking said segmental cam for rocking said second named shaft for moving said markers upwardly out of a marking position.

In testimony whereof I affix my signature in presence of two witnesses.

RAY N. MOORE.

Witnesses:
C. H. PASLEY,
MRS. WM. MOORE.

Copies of this patent may be obtained for five cents each, by addressing the "Commissioner of Patents, Washington, D. C."